United States Patent [19]
Ohsaki et al.

[11] Patent Number: 5,725,012
[45] Date of Patent: Mar. 10, 1998

[54] STOP VALVE STRUCTURE

[75] Inventors: Hiroshi Ohsaki; Hiroshi Shimamura, both of Ibaraki-ken; Katsuyuki Kido, Seto, all of Japan

[73] Assignee: Kyosan Denki Co., Ltd., Sashima-Gun, Japan

[21] Appl. No.: 706,912

[22] Filed: Sep. 3, 1996

[30] Foreign Application Priority Data

Sep. 8, 1995 [JP] Japan .................................. 7-255818

[51] Int. Cl.$^6$ .................................................. F16K 24/04
[52] U.S. Cl. ................................................. 137/202; 137/43
[58] Field of Search ................................. 137/43, 202

[56] References Cited

U.S. PATENT DOCUMENTS

| | | | |
|---|---|---|---|
| 2,990,842 | 7/1961 | Good | 137/202 |
| 3,768,498 | 10/1973 | Urban . | |
| 4,487,215 | 12/1984 | Green . | |
| 4,886,089 | 12/1989 | Gabrlik et al. . | |
| 5,065,782 | 11/1991 | Szlaga . | |
| 5,325,882 | 7/1994 | Forsythe et al. . | |
| 5,522,417 | 6/1996 | Tomioka et al. | 137/202 X |
| 5,529,086 | 6/1996 | Kasugai et al. | 137/202 |
| 5,573,030 | 11/1996 | Ohsaki et al. | 137/202 X |

*Primary Examiner*—Gerald A. Michalsky
*Attorney, Agent, or Firm*—Oliff & Berridge, P.L.C.

[57] ABSTRACT

A stop valve structure that is accommodated in a fuel tank includes a casing, a float disposed inside the casing for reciprocating movement within the casing, a bottom wall defining a lower end of the casing, at least one hole provided along the periphery of the bottom wall, and a valve opening that is selectively opened and closed by the reciprocating movement of the float within the casing in accordance with a liquid fuel level within the casing. The float is provided with a tapered portion at the lower end thereof which becomes smaller in diameter toward the lower end of the casing. The float is further provided with a valve seat in an upper portion thereof. A valve mounting portion is disposed inside the casing and a valve element is mounted to said valve mounting portion. The valve seat cooperates with the valve element to selectively open and close the valve opening. These features ensure the operational stability and smoothness of the stop valve.

10 Claims, 2 Drawing Sheets

5,725,012

STOP VALVE STRUCTURE

BACKGROUND OF THE INVENTION

1. Field of the Invention

The present invention relates to a stop valve employed in a breathing system of a fuel tank for an internal combustion engine of a motor vehicle and, more particularly, to an improvement in a stop valve having a float.

2. Description of the Prior Art

Most of the fuel tanks of internal combustion engine vehicles are provided with a breathing system that allows the tanks to communicate with the atmosphere. Such a breathing system is normally provided with a canister for preventing fuel vapor from escaping to the atmosphere.

If the breathing system is open to the outside when the vehicle (or the fuel tank) tilts beyond a certain degree or flips over, fuel from the tank will likely flow through the system to the outside. Therefore, the breathing system is provided with a stop valve for closing the system if the vehicle is significantly tilted or flipped over.

Also, it is desirable to supply fuel vapor to the canister via the breathing system during fuel supply. In this case, the breathing system needs to be closed when the fuel surface rises to a predetermined level.

A typical stop valve employed in the fuel vapor breathing system has a float that floats in liquid fuel to close the system when the fuel surface rises to a predetermined level.

An example of a known stop valve (as described in Japanese Laid-Open Patent Application No. 2-112658) will be described below with reference to FIG. 3, which is a sectional view of such a stop valve.

The stop valve comprises a casing 1 and a float 2 provided therein. A spring 4 is disposed between the float 2 and a barrier plate 3 so as to urge the float 2 toward a valve opening 5. The casing 1 defines a breathing port 6 with a valve opening 5 that serves as an inlet to the breathing port 6. A valve element 7 for closing the valve opening 5 is coupled to a mounting member 8 that is connected to the float 2. A plurality of holes 9 are provided along the periphery of the barrier plate 3.

The stop valve operates as follows. The breathing port 6 is in communication with the atmosphere via a canister (not shown). The canister captures or absorbs fuel vapor from the breathing port 6, thus preventing the fuel vapor from escaping to the atmosphere.

If the fuel tank is tilted or inclined beyond a certain degree, which causes the liquid fuel level in the tank to rise, the fuel enters through the holes 9 in the direction of arrow P as shown in the figure. Then, the float rises so that the valve element 7 coupled to the float 2 closes the valve opening 5. Thus, fuel in the fuel tank 1 will not leak outside via the breathing system.

When the fuel tank 1 resumes its normal posture, which causes the fuel surface to fall below a predetermined level, the float 2 descends by gravity.

Demand for increased breathing capacity resulting from intensified regulation of HC emission in recent years has increased the diameter of the valve opening 6. Such increased area of the valve opening 6 inevitably leads to an increase in the area of the holes 9, thus allowing an increased amount of fluid to flow therethrough.

Furthermore, an increased operational smoothness is required to ensure sufficient reliability and stability of various devices for motor vehicle use. The breathing system must be closed immediately after the fuel tank has been tilted to prevent fuel from flowing into the breathing system. For this reason, a significant reduction in size and weight is indispensable.

However, when the above-described known stop valve is enlarged, it has the following drawbacks. With the holes 9 enlarged for the purpose of allowing an increased amount of fluid to flow therethrough, or for the purpose of reducing pressure loss, the float 2 itself will likely be forced upward by the increased fluid, closing the valve opening 5.

On the other hand, increasing the size of the float 2, which is constructed to be coupled to the valve element 7, may result in an increase in the weight thereof, which impedes the operational smoothness thereof.

Furthermore, the valve element 7 is likely to swell in the direction of the arrow due to the impregnation with fuel, until it reaches the state as shown in the figure with a broken line. In this case, such swelling in the radial direction leads to the displacement of the sealing portions of the valve element as well as an increase in weight thereof, deteriorating the performance thereof.

SUMMARY OF THE INVENTION

Accordingly, an object of the present invention is to provide a stop valve that overcomes the above-described drawbacks of the known stop valve and enhances the operational stability and smoothness thereof.

According to a first aspect of the present invention, there is provided a stop valve structure accommodated in a fuel tank comprising a float disposed inside the casing for reciprocating movement within the casing, a bottom wall defining the lower end of the casing, and at least one hole (preferably a plurality of holes) provided along the periphery of the bottom wall. A valve opening is selectively opened or closed by the reciprocating movement of the float within the casing in accordance with the liquid fuel level. The float is provided with a tapered portion at the lower end thereof which becomes smaller in diameter toward the lower end of the casing.

According to another aspect of the present invention, there is provided a stop valve structure accommodated in a fuel tank comprising a float disposed inside a casing for reciprocating movement within the casing, a bottom wall defining the lower end of the casing, and at least one hole provided along the periphery of the bottom wall. A valve opening is selectively opened or closed by the reciprocating movement of the float within the casing in accordance with the liquid fuel level. The float is provided with a valve seat in the upper portion thereof, a valve mounting portion is disposed inside the casing and a valve element that cooperates with the valve seat on the float is mounted to the valve mounting portion.

According to still another aspect of the present invention, there is provided a stop valve structure accommodated in a fuel tank comprising a float disposed inside a casing for reciprocating movement within the casing, a bottom wall defining the lower end of the casing, and at least one hole provided along the periphery of the bottom wall. A valve opening is selectively opened or closed by the reciprocating movement of the float within the casing in accordance with the liquid fuel level. The float is provided with a tapered portion at the lower end thereof, which becomes smaller in diameter toward the lower end of the casing. The float is further provided with a valve seat in the upper portion thereof, A valve mounting portion is disposed inside the casing and a valve element that cooperates with the valve seat on the float is mounted to the valve mounting portion.

According to the present invention, the float is readily prevented from being forced upward by fluid flowing through the holes even if pressure loss has been reduced due to an increase in area of the holes. Therefore, any possible malfunction of the float for selectively opening or closing the valve opening will be avoided.

Further, according to the invention, the float is constructed so that the valve element 7 is not attached to the float, which results in a decrease in weight thereof, thus ensuring the operational smoothness thereof.

DETAILED DESCRIPTION OF A PREFERRED EMBODIMENT

Figure 1:
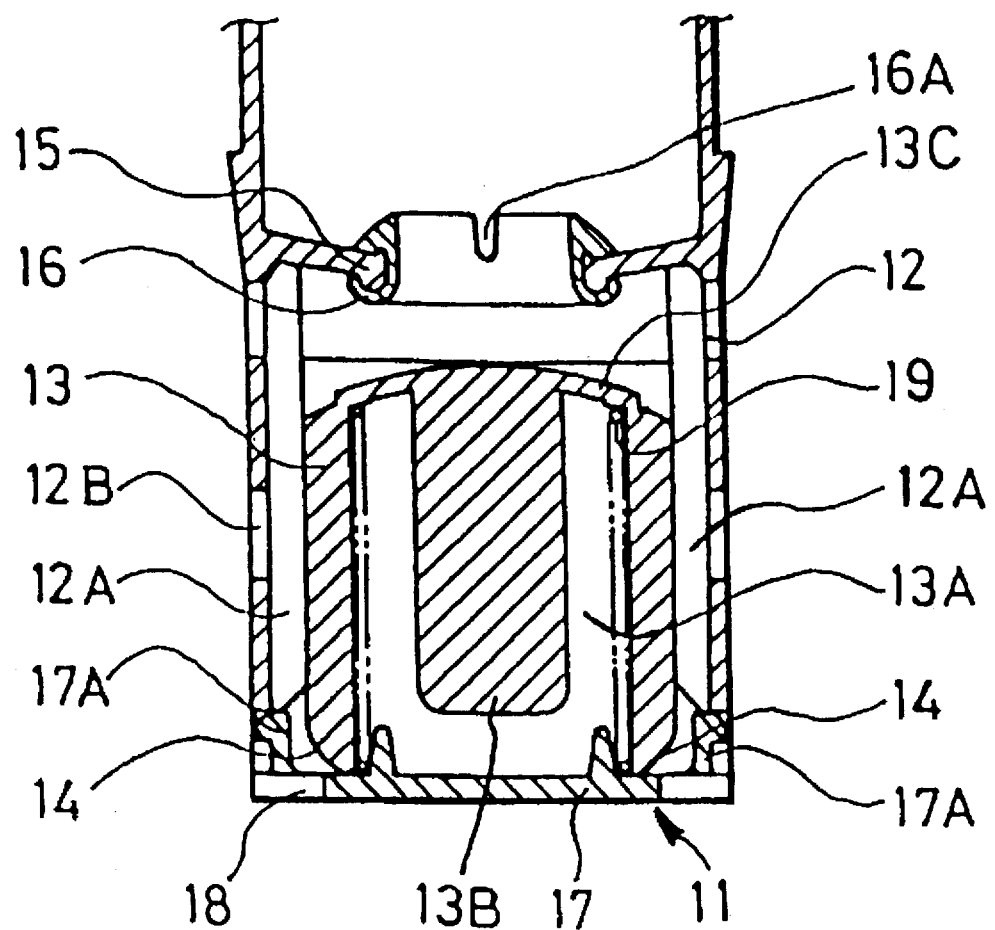
FIG. 1 is a sectional view of an embodiment of the stop valve of the present invention.

An embodiment of the present invention will be described with reference to the accompanying drawings.

A stop valve according to the present invention has a casing 12, and a float 13 disposed inside the casing 12 for reciprocating movement within the casing 12. A tapered portion 14 is provided at the lower end of the float 13. A valve mounting portion 15 is disposed in the upper part of the casing 12, and a valve element 16 is mounted to the valve mounting portion 15. A bottom wall 17 is provided at the lower end of the casing 12, and at least one hole (preferably a plurality of holes) 18 is provided along the periphery of the bottom wall 17. The valve element 16 has an opening at the center thereof which is in communication with a breathing port.

The casing 12 has a tubular shape. Reinforcing ribs 12A are formed on the internal wall of the casing 12. A plurality of through holes 12B are formed through the circumferential wall of the casing 12.

The float 13 generally has a shape of an inverted cup, defining a space 13A therein. According to this embodiment, there is a drooping element 13B disposed in the internal space 13A and integrally connected with the float 13. The tapered portion 14 is provided at the lower end of the float 13. The tapered portion 14 becomes smaller in diameter toward the lower end of the casing 12 so that passage resistance of fluid flowing upward is significantly reduced. The float 13 has a valve seat 13C for closing a valve element 16 mounted in the upper portion of the casing 12. The valve element 16 will be explained later.

Figure 2:
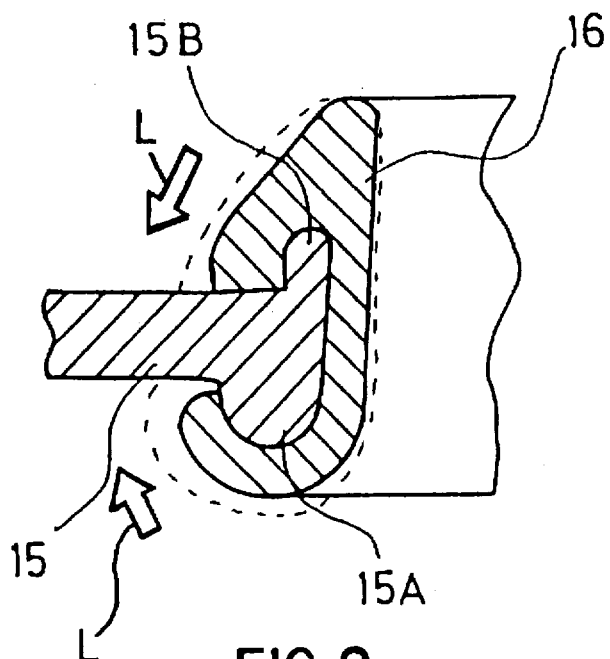
FIG. 2 is an enlarged sectional view of the valve element and the valve mounting portion of FIG. 1.
Figure 3:
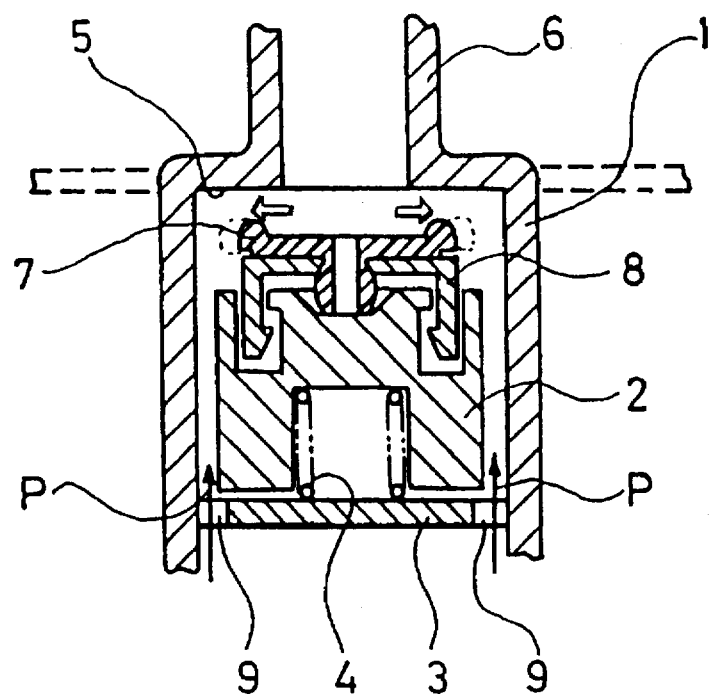
FIG. 3 is a sectional view of a known stop valve.

As shown in the FIG. 2 in detail, the valve mounting portion 15 is provided with an opening at the center thereof, and it is disposed in the upper portion of the casing 12. A flaring portion 15A flaring downward and an engaging portion 15B protruding upward are provided at the center of the valve mounting portion 15. Both the flaring portion 15A and the engaging portion 15B of the valve mounting portion 15 are covered with and securely fixed to the valve element 16. An opening is provided at the center of the valve element 16. The valve element 16, which covers the engaging portion 15B, is provided with a plurality of slits 16A along the periphery thereof. The slits 16A make it easier to fix the valve element 16 to the valve mounting portion 15.

Further, a plurality of engaging legs 17A are formed along the periphery of the bottom wall 17. The ends of the engaging legs 17A are hook-shaped. The bottom wall 17 is secured to the casing 12 by inserting the hook-shaped ends of the engaging legs 17A into holes provided on the casing 12. A spring 19 is provided on the bottom wall 17 so as to urge the float 13 to rise.

Operation of the thus-constructed stop valve will be described below.

When fluid flows upward to enter the casing 12 through the holes 18, the float 13 is urged to rise due to fluid passage resistance. However, since the fluid passage resistance is reduced by the tapered portion 14 formed at the lower end of the float 13, the force urging the float 13 to rise is reduced correspondingly. Thus, any possible malfunction of the float 13 will be avoided.

If the fuel tank is tilted or inclined beyond a certain degree, which causes the liquid fuel level to rise, the float 13 rises so that the valve seat 13C closes the valve opening in the valve element 16. However, since the weight of the float 13 has been significantly reduced in comparison with the conventional structure in which a valve element is attached to the top of the float 13, the operational smoothness thereof will be enhanced.

Although the construction as shown in FIG. 2 allows the valve element 16 to swell due to impregnation with fuel, the swelling portion thereof escapes in the direction of the arrows L, until it reaches the state as shown in FIG. 2 with a broken line. In this case, the degree of swelling in the radial direction is 15%. Because there is little swelling in the axial direction, sufficient sealing performance is ensured. Accordingly, there is no stress remaining in the valve element 16, which prevents deformation thereof.

The following advantages of the present invention will be observed. First, the fact that a tapered portion is provided makes it possible to enlarge the area of the holes to the level of the tapered portion. Thus, pressure loss will be significantly reduced, the float will be prevented from rising even if fluid has entered the casing through the holes, and operational smoothness of the float will be enhanced. Because the float will not rise regardless of an increase in the area of the holes, it becomes possible to further reduce the diameter of the stop valve given the same pressure loss. As a result, a very compact stop valve structure can be obtained.

Also, because the valve element is not coupled to the float, an increase in weight of the float will not be evoked. Thus, operational smoothness will be ensured. Further, because the valve element is constructed to cover the valve mounting portion, any possible flaring caused by fuel impregnation will not cause the valve element to deform.

Further, because the valve element is provided with slits, mounting operation thereof will be remarkably facilitated.

While the present invention has been described with reference to what is presently considered to be a preferred embodiment, it is to be understood that the invention is not limited to the disclosed embodiment. On the contrary, the invention is intended to cover various modifications and equivalent arrangements included within the spirit and scope of the appended claims.

What is claimed is:

1. A stop valve structure accommodated in a fuel tank comprising:

a casing;

a float disposed inside the casing for reciprocating movement within the casing;

a bottom wall defining a lower end of said casing; and at least one hole provided along a periphery of the bottom wall;

wherein a valve opening is selectively opened and closed by reciprocating movement of the float within the casing in accordance with a liquid fuel level within the casing; and wherein said float is provided with a tapered portion at a lower end thereof such that an outside diameter of said float becomes smaller toward the lower end of the casing.

2. A stop valve structure according to claim 1, wherein said float has a shape of an inverted cup so as to define an inner space therein.

3. A stop valve structure accommodated in a fuel tank comprising:

a casing having an interior chamber and a valve mounting portion, wherein said valve mounting portion has a flaring portion which flares downward into the chamber, said flaring portion including an engaging portion protruding upward and an engaging portion protruding downward;

a valve element mounted on said valve mounting portion, wherein the valve element is constructed so as to cover both upward and downward engaging portions of said flaring portion;

a float disposed inside the casing for reciprocating movement within the casing;

a bottom wall defining a lower end of said casing; and at least one hole provided along a periphery of the bottom wall;

wherein a valve opening is selectively opened and closed by reciprocating movement of the float within the casing in accordance with a liquid fuel level within the casing; and wherein said float is provided with a valve seat in the upper portion thereof that cooperates with the valve element to open and close said valve opening.

4. A stop valve structure according to claim 3, wherein said float is provided with a tapered portion at a lower end thereof such that an outside diameter of said float becomes smaller toward the lower end of the casing.

5. A stop valve structure according to claim 4, wherein the portion of said valve element covering the engaging portion of said valve mounting portion is provided with a plurality of slits.

6. A stop valve structure according to claim 3, wherein said valve element is removably attached to said flaring portion.

7. A stop valve structure accommodated in a fuel tank comprising:

enclosure means having a chamber for enclosing the valve structure and a mounting portion with a flaring portion which flares downward into the chamber, said flaring portion including an engaging portion protruding upward and an engaging portion protruding downward;

a bottom wall defining a lower end of said enclosure means; and at least one hole provided along a periphery of the bottom wall;

float means for moving within the enclosure means in accordance with a liquid fuel level within the enclosure means;

first closure means for closing an outlet of the valve structure, said first closure means being mounted on said enclosure means so as to cover both upward and downward engaging portions of said flaring portion; and second closure means, mounted on the float means, for cooperating with the first closure means to selectively open and close the outlet based on reciprocating movement of the float means within the enclosure means.

8. A stop valve structure according to claim 7, wherein a portion of the first closure means covering the engaging portion of the mounting portion is provided with a plurality of slits.

9. A stop valve structure according to claim 7, wherein the float means is provided with a tapered portion at a lower end thereof such that an outside diameter of the float means becomes smaller toward the lower end of the enclosure means.

10. A stop valve structure according to claim 7, wherein said first closure means is removably attached to said flaring portion.

* * * * *